(No Model.)  9 Sheets—Sheet 1.

J. JACKS.
OLIVER.

No. 600,201. Patented Mar. 8, 1898.

Witnesses:
Inventor:
Jonathan Jacks
by Wm. H. Finckell
his Atty.

(No Model.) 9 Sheets—Sheet 2.
J. JACKS.
OLIVER.
No. 600,201. Patented Mar. 8, 1898.
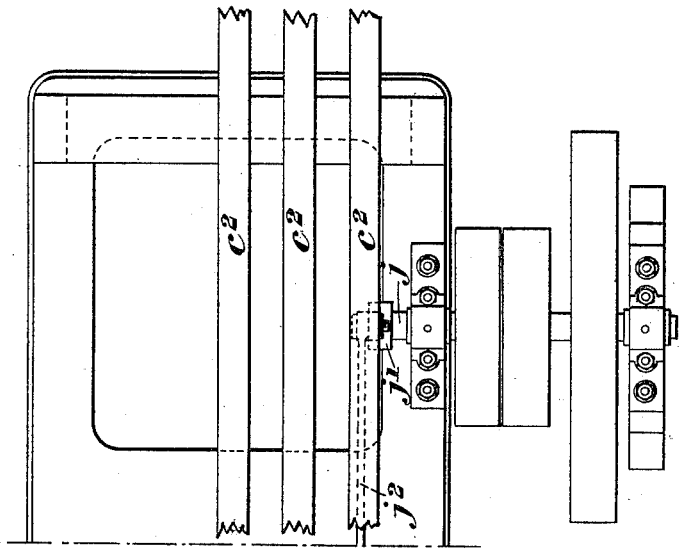
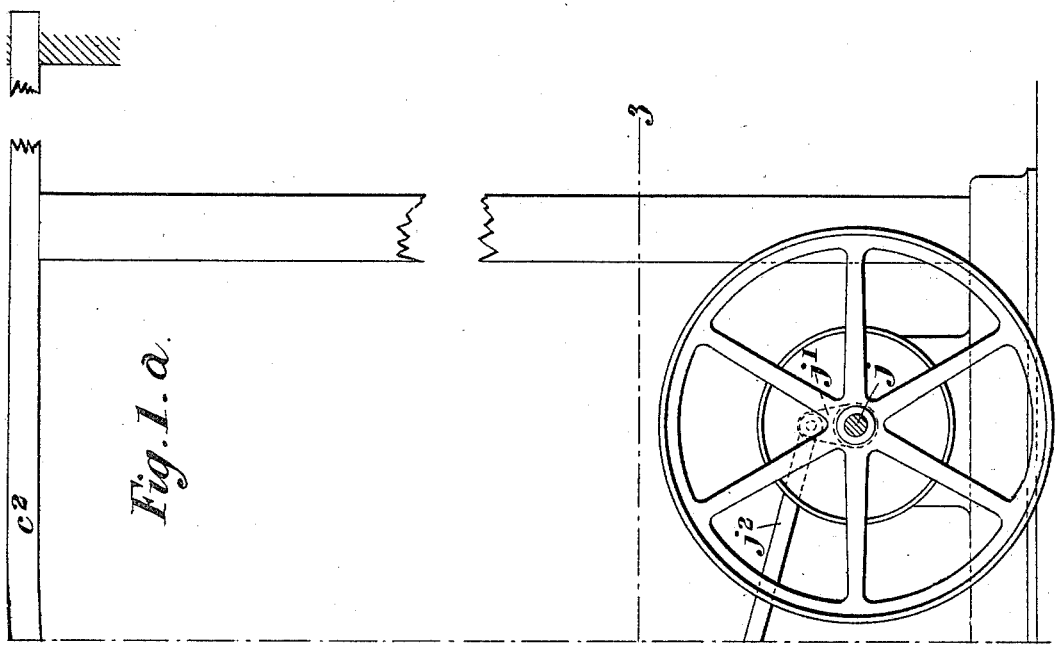

(No Model.) 9 Sheets—Sheet 3.

J. JACKS.
OLIVER.

No. 600,201. Patented Mar. 8, 1898.

Witnesses:
E. A. Kinsell
Nellie Callahan

Inventor:
Jonathan Jacks
by W. H. Kinsell
his Atty.

(No Model.)

J. JACKS.
OLIVER.

No. 600,201. Patented Mar. 8, 1898.

Witnesses
E. A. Fincuel
Nellie Callahan

Inventor
Jonathan Jacks
by Wm. H. Fincuel
his Atty (No Model.)    J. JACKS.    9 Sheets—Sheet 5.
OLIVER.
No. 600,201.    Patented Mar. 8, 1898.
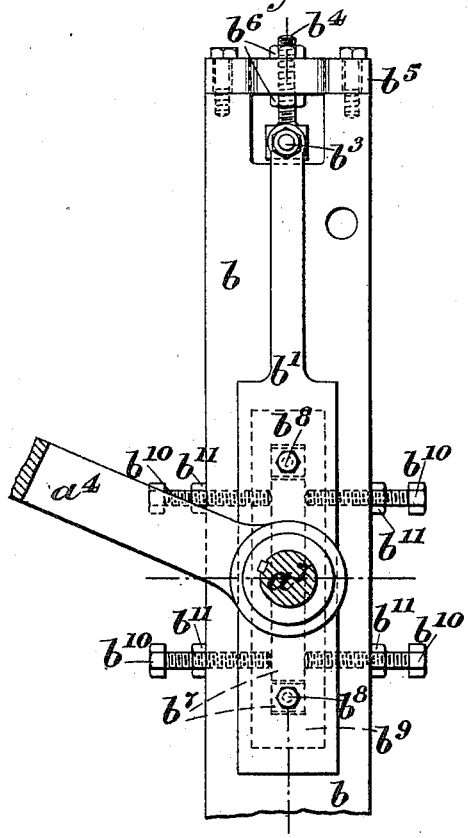
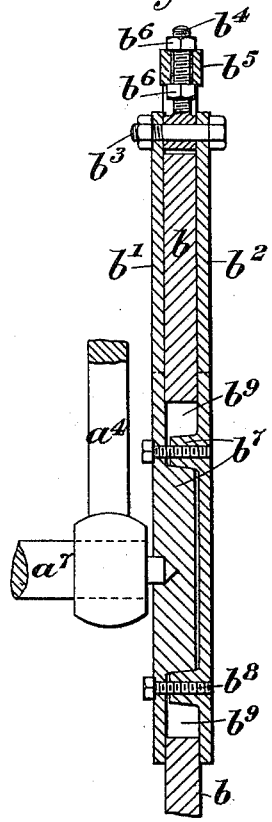
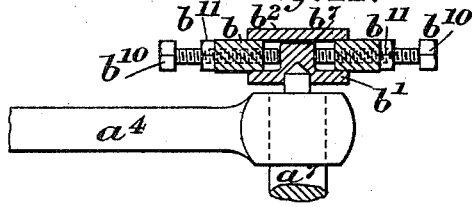
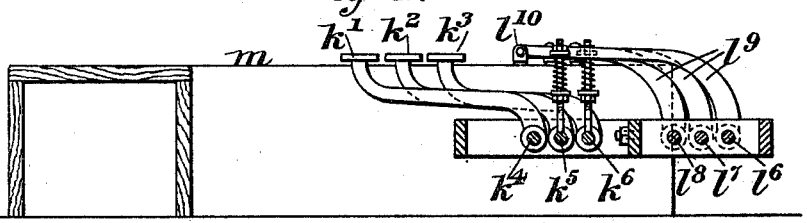

(No Model.) 9 Sheets—Sheet 6.

J. JACKS.
OLIVER.

No. 600,201. Patented Mar. 8, 1898.

(No Model.) 9 Sheets—Sheet 7.

J. JACKS.
OLIVER

No. 600,201. Patented Mar. 8, 1898.

Witnesses:
E. A. Fincrel
Nellie Callahan

Inventor
Jonathan Jacks
by Wm. H. Fincrel
his Atty (No Model.) 9 Sheets—Sheet 8.
J. JACKS.
OLIVER.
No. 600,201. Patented Mar. 8, 1898.
Fig. 12. Fig. 13. Fig. 14.
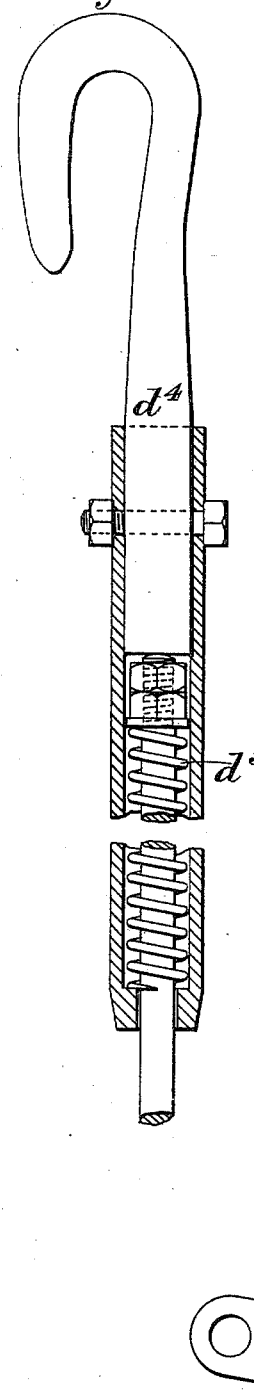
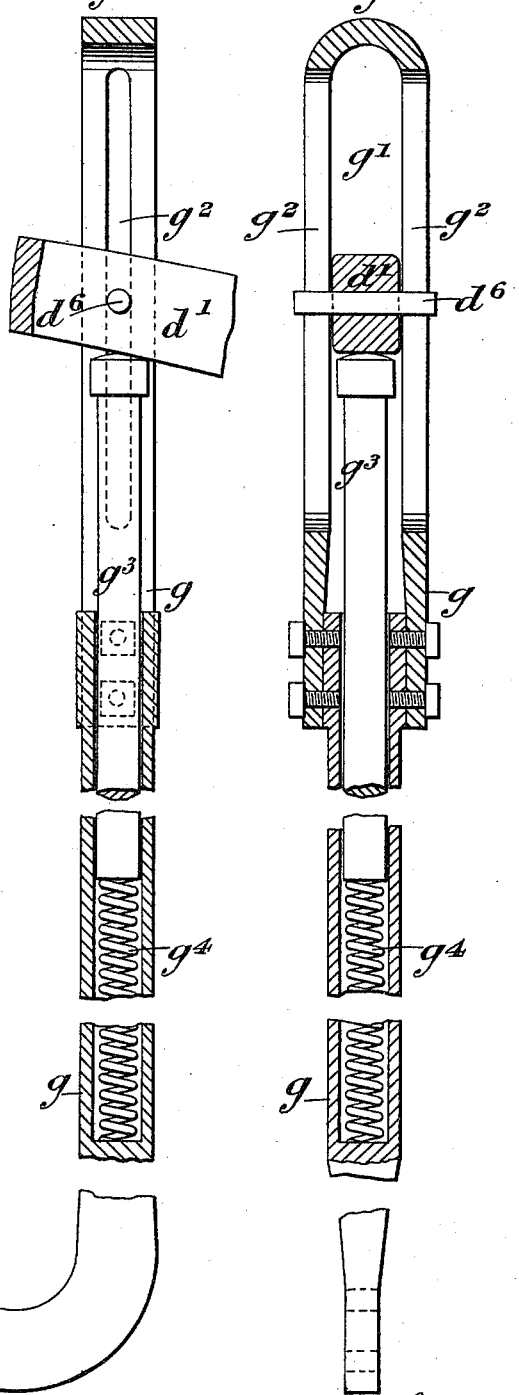
Witnesses:
E. A. Fincrel.
Nellie Callahan.
Inventor:
Jonathan Jacks,
by Wm. H. Fincrel,
his Atty.
THE NORRIS PETERS CO., PHOTO-LITHO., WASHINGTON, D. C.

(No Model.)
9 Sheets—Sheet 9.

J. JACKS.
OLIVER.

No. 600,201.
Patented Mar. 8, 1898.

UNITED STATES PATENT OFFICE.

JONATHAN JACKS, OF IPSWICH, ENGLAND.

OLIVER.

SPECIFICATION forming part of Letters Patent No. 600,201, dated March 8, 1898.

Application filed September 10, 1897. Serial No. 651,170. (No model.)

*To all whom it may concern:*

Be it known that I, JONATHAN JACKS, a subject of the Queen of Great Britain, residing at Ipswich, in the county of Suffolk, England, have invented certain new and useful Improvements in that class of Hammers known as Olivers, of which the following is a full, clear, and exact description.

The invention has for its object improvements in that class of hammers known as "olivers," in order to enable a series of such hammers to be combined in the same machine and worked in such a manner that they may be all operated simultaneously or any one or more may be thrown out of action, while a lighter or heavier blow is enabled to be given by such hammers, as may be desired.

My invention is illustrated in the accompanying drawings, in which—

Figures 1, 16:
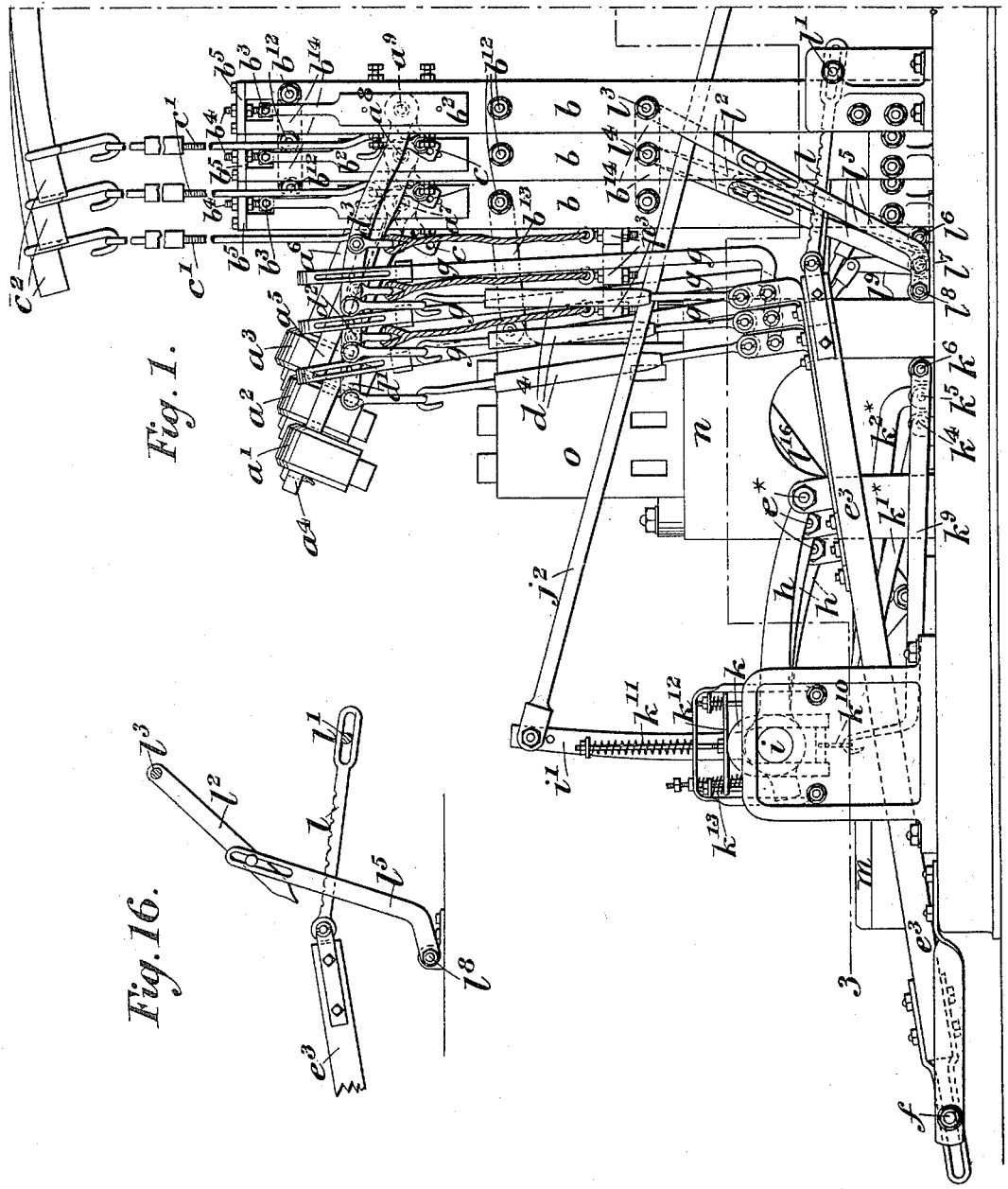
Figure 15:
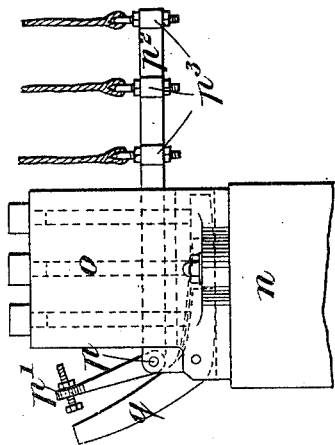
Figure 2:
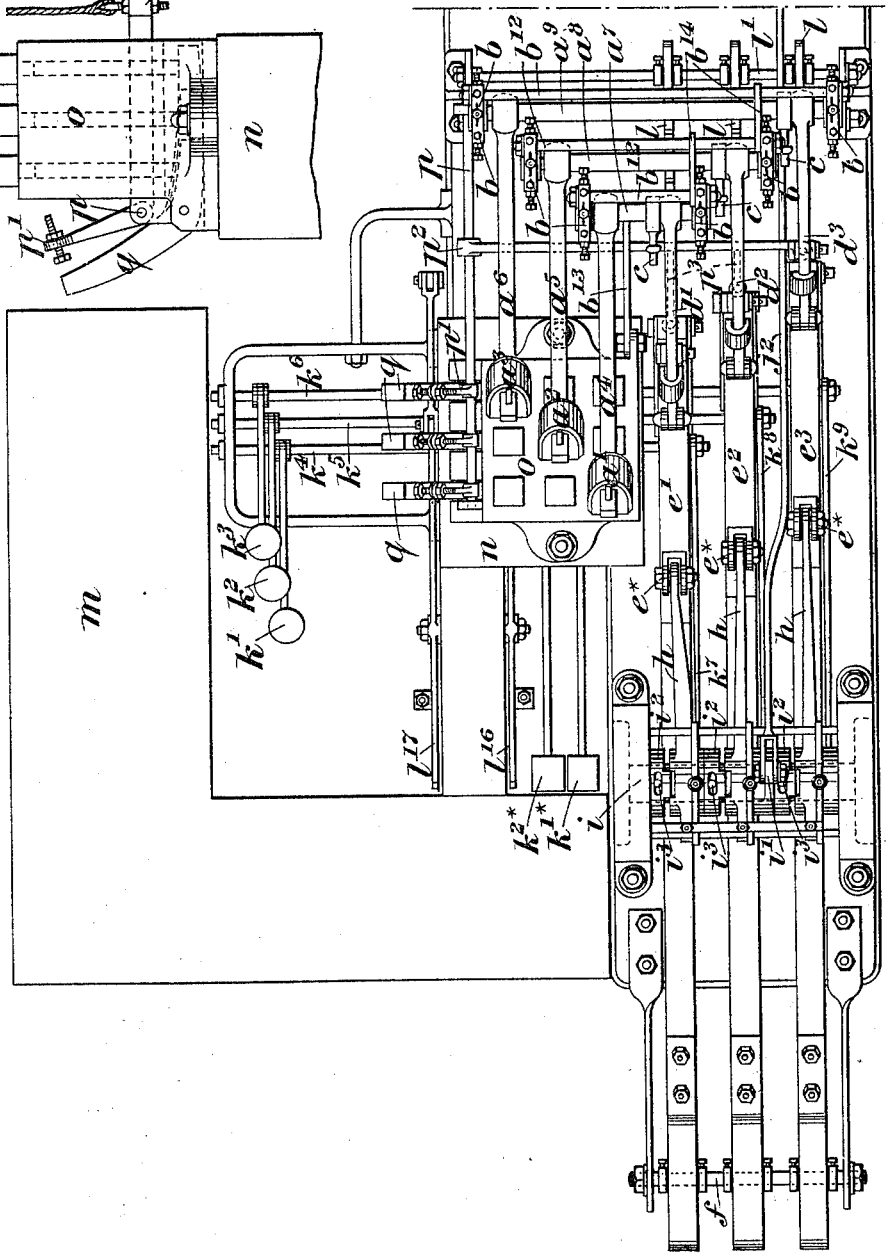
Figure 3:
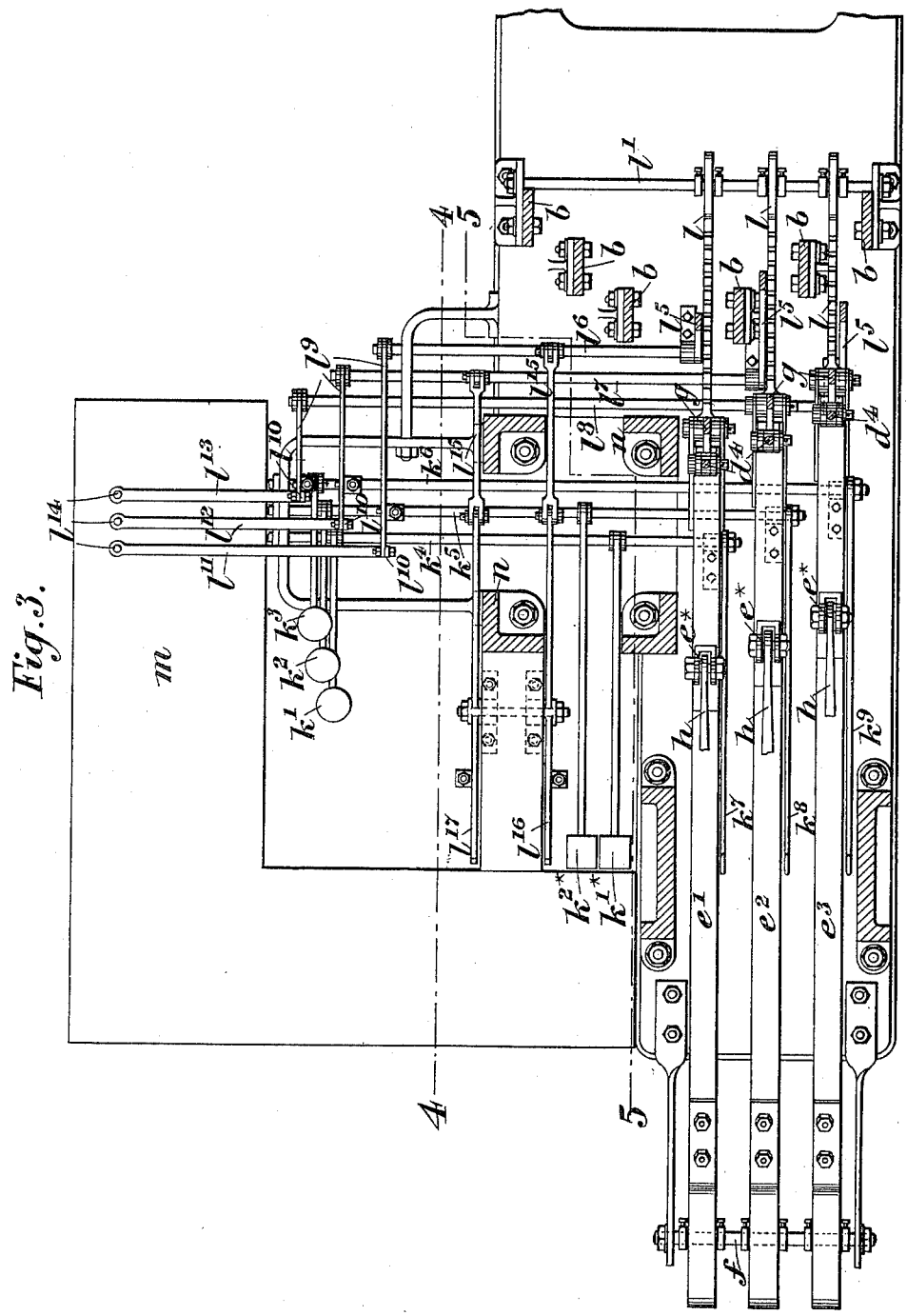
Figure 7:
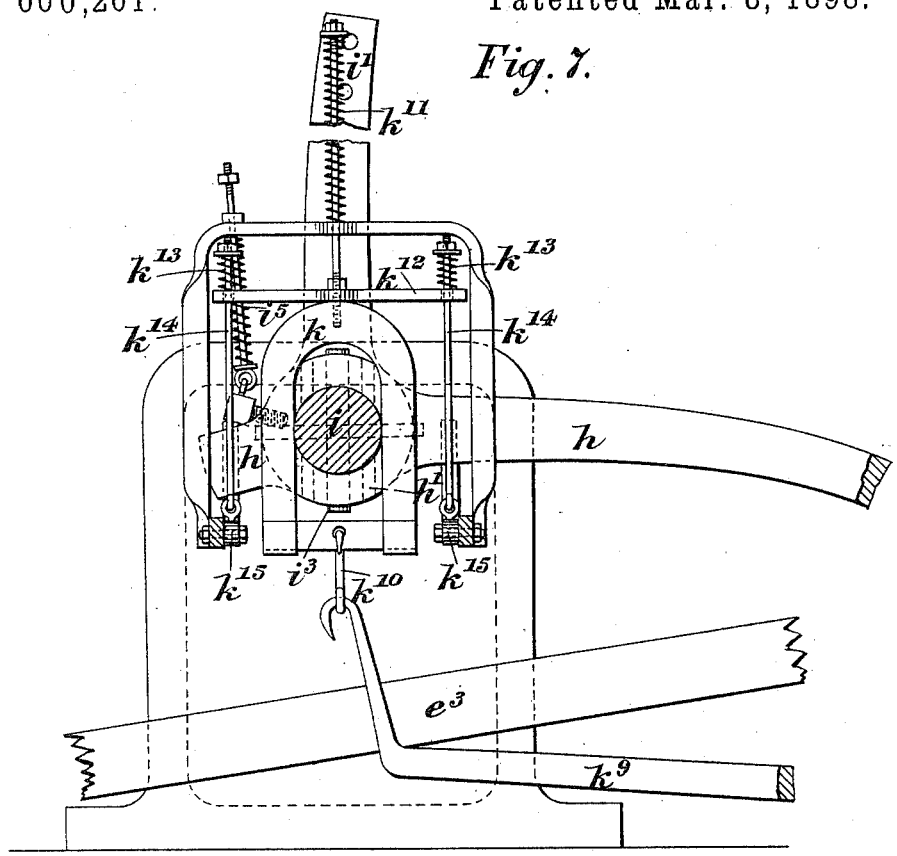
Figure 5:
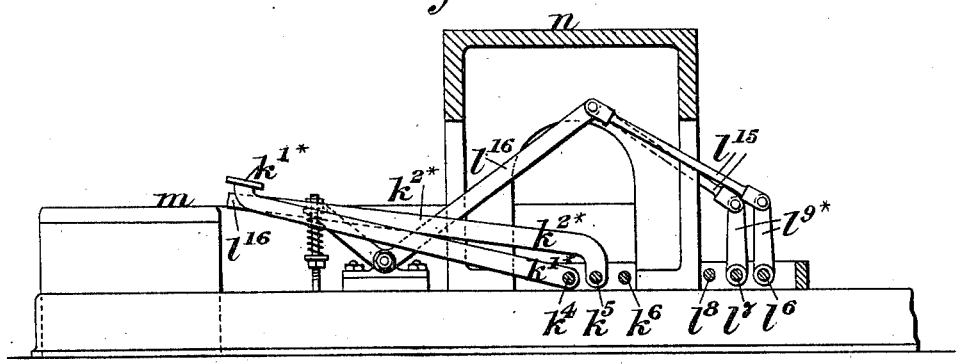
Figure 6:
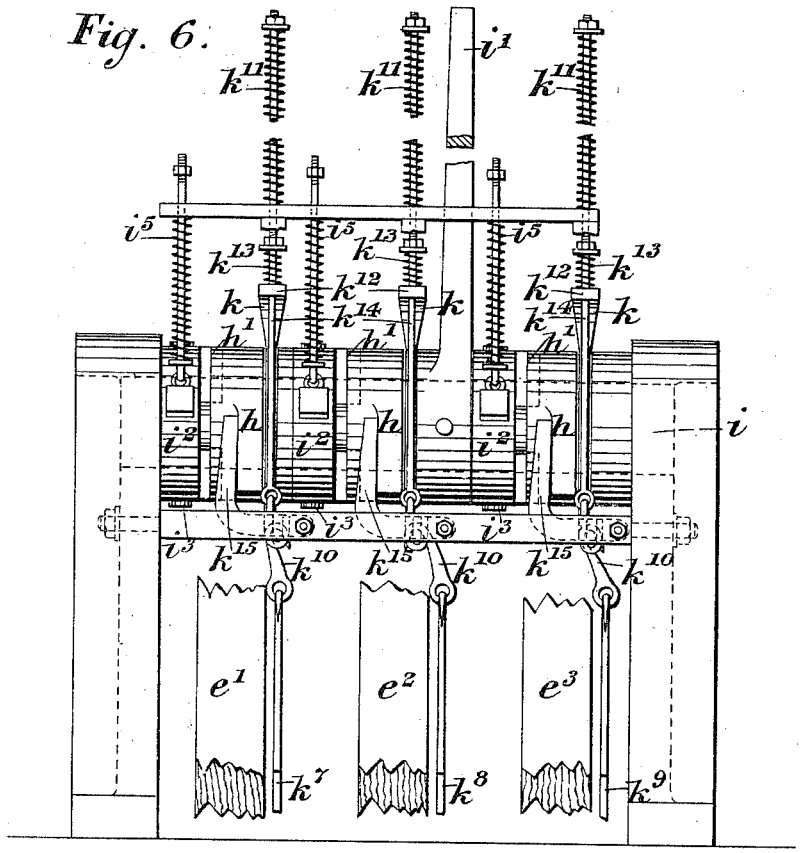
Figure 8:
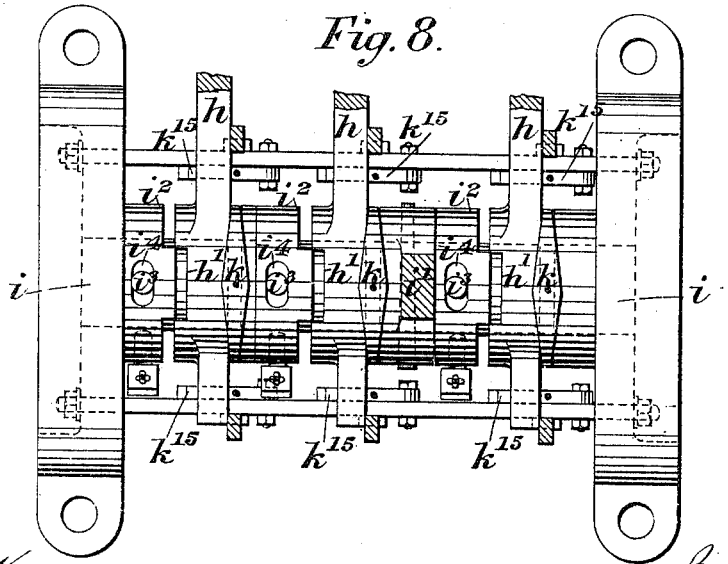
Figure 15A:
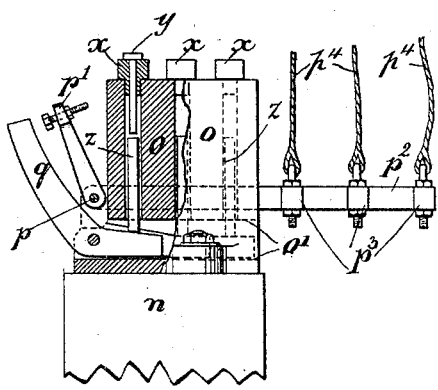

Figure 1 is a side elevation of an oliver provided with three hammers. Fig. 1$^a$ is the remainder of Fig. 1. Fig. 2 is a plan or top view with some of the parts omitted for the sake of clearness. Fig. 2$^a$ is the remainder of Fig. 2. Fig. 3 is a sectional plan drawn on the line 3 3 of Fig. 1. Fig. 4 is a vertical section drawn on the line 4 4 of Fig. 3. Fig. 5 is a sectional elevation drawn on the line 5 5 of Fig. 3. Figs. 6, 7, and 8 are respectively a front elevation, a vertical cross-section, and a sectional plan of the clutch arrangement and some of the parts connected therewith for operating the hammers and throwing them into and out of action. Figs. 9, 10, and 11 are respectively an inner side elevation, a vertical cross-section, and a horizontal section of one of a pair of uprights carrying one of the hammer-spindles. Fig. 12 is a vertical section of the spring connection between one of the hammer-operating levers and its treadle-lever. Figs. 13 and 14 are two vertical sections, drawn at right angles to each other, of one of the hammer-steadying links. Fig. 15 is a front elevation of the tool-carrying block and levers for operating the work-releasing levers, and Fig. 15$^a$ is a partly-sectional view of the same parts. Fig. 16 is a side elevation of parts for regulating the strength of blow of one of the hammers. Figs. 6 to 14 are drawn on a larger scale than the other figures.

In all the figures like parts are indicated by similar letters of reference.

$a'$ $a^2$ $a^3$ are the hammer-heads, which are carried by a series of parallel arms $a^4$ $a^5$ $a^6$, fixed to parallel cross-spindles $a^7$ $a^8$ $a^9$. Each spindle $a^7$ $a^8$ $a^9$ is mounted in a separate pair of uprights $b$ $b$ in the following manner to enable the said spindles, and consequently the hammers, to be adjusted both laterally and vertically: Each spindle is mounted at each end in a frame $b'$ $b^2$, suspended from its upper end by a pin $b^3$, passing through a bearing at the lower end of a screw $b^4$. This screw is carried by the cross-bar $b^5$, with capability of adjustment by means of nuts $b^6$. Each part of each frame $b'$ $b^2$ is provided with interfitting projections $b^7$, and these are connected together by screws $b^8$. These projections $b^7$ are located within slots $b^9$ in the uprights $b$, and screws $b^{10}$, screwed into the uprights $b$, act upon the said projections $b^7$ to adjust and fix the frames $b'$ $b^2$ and the hammer-spindle in the desired position. Lock-nuts $b^{11}$ act to prevent the accidental shifting of the screws $b^{10}$. The uprights $b$ of each pair are tied firmly together by rods $b^{12}$, and each pair of uprights is firmly secured to the block $o$ by tie-bars $b^{13}$, only one of which latter is shown to avoid confusion in the drawings. The several pairs of uprights are also connected with each other by bars $b^{14}$. A short arm $c$ on each of said spindles $a^7$ $a^8$ $a^9$ is connected by links $c'$ with a spring-pole $c^2$ overhead, as usual. A longer arm $d'$, $d^2$, or $d^3$, on each of said spindles, is connected by links $d^4$ with a treadle-lever $e'$, $e^2$, or $e^3$ near to the rear end of the latter, such links being formed in two parts, with an interposed spring $d^5$, whereby they exert an elastic force on the hammers. The forward slotted ends of the treadle-levers $e'$ $e^2$ $e^3$ are mounted on a cross-shaft $f$ with capability of rocking and sliding a short distance to and fro thereon.

I also provide means whereby the longer arms $d'$ $d^2$ $d^3$, and consequently the hammers, are caused to be steady in their motion—that is to say, as free as possible from vibration. For this purpose I connect each of the longer arms $d'$ $d^2$ $d^3$ with the rear end of its actuating treadle-lever by a link $g$, provided with a slot $g'$, through which the correspond- -ing longer arm is passed. A pin $d^6$, passed through each longer arm, enters slots $g^2$ in the link $g$ to keep the latter in proper relation with its longer arm $d'$, $d^2$, or $d^3$ and permit said link to slide in relation to said longer arm. Each of such links $g$ is provided with a rod $g^3$, pressed upward by a spring $g^4$, so as to press constantly against the under side of such longer arm. Motion is given to these treadle-levers $e'$ $e^2$ $e^3$ by operating-arms $h$, jointed thereto at $e^*$ and loosely mounted on a cross-shaft $i$, to which a rocking motion is given from a crank $j'$ on a rotating shaft $j$, such crank $j'$ being connected by connecting-rod $j^2$ and lever $i'$ with said cross-shaft $i$. On this cross-shaft $i$ are mounted a series of clutches $i^2$, having a short lost motion around such shaft, but immovable endwise thereof by means of pins $i^3$, passed through the cross-shaft and through slots $i^4$ in the clutches $i^2$. The operating-arms $h$ are provided with clutch-surfaces $h'$ to act in connection with said clutches. On the cross-shaft $i$ are also mounted a series of sliding wedges $k$, one at one side of each operating-arm $h$. These wedges $k$ are capable, when desired, of being depressed by means of treadles $k'$ $k^2$ $k^3$ $k'^*$ $k^{2*}$, fixed on shafts $k^4$ $k^5$ $k^6$ and connected to such wedges by levers $k^7$ $k^8$ $k^9$ and links $k^{10}$ to place their coacting operating-arms $h$ in connection with their respective clutches $i^2$, while at other times the said wedges are raised by means of springs $k^{11}$ to enable their coacting operating-arms $h$ to be automatically moved sidewise out of gear with their clutches $i^2$ by the aforesaid springs $k^{11}$, acting, through the cross-bar $k^{12}$, springs $k^{13}$, and rods $k^{14}$, on crank-lever arms $k^{15}$, acting on one side of each of said operating-arms $h$. The treadles $k'$ $k^2$ $k^3$ are at the side of the machine, while the treadles $k'^*$ $k^{2*}$ are at the front thereof. The clutches $i^2$ are acted upon by springs $i^5$ in such manner as to insure their being in proper position to clutch with the clutch-surfaces $h'$ of the operating-arms $h$ when the latter are moved sidewise for such purpose.

The weight of the blow of each hammer is regulated by limiting the height to which it is raised. One method of effecting this is as follows: The inner end of each of the treadle-levers $e'$ $e^2$ $e^3$ has jointed thereto a rack-bar $l$, which at its rear end is slotted and capable of sliding to and fro and rocking on a fixed horizontal shaft $l'$. In connection with each of said rack-bars is a pawl $l^2$, mounted loosely on a fixed horizontal spindle $l^3$ or $l^4$, one of said pawls being for convenience mounted on one shaft $l^3$ and the other two on the shaft $l^4$. These pawls are each operated by a lever $l^5$, fixed on a separate horizontal shaft $l^6$, $l^7$, or $l^8$, which latter shafts are provided with levers $l^9$, connected by pin-joints $l^{10}$ to the turned-up end of treadle-levers $l^{11}$ $l^{12}$ $l^{13}$, loosely connected at $l^{14}$ to the platform $m$, thus permitting the blow of each hammer to be regulated from the side of the machine. The shafts $l^6$ $l^7$ have also fixed on them two other levers $l^{9*}$, connected by links $l^{15}$ to treadle-crank levers $l^{16}$ $l^{17}$, by which the blow of their respective hammers $a'$ $a^2$ can be regulated from the front of the machine. The pawl-operating levers $l^5$ are connected with the pawls $l^2$ by a pin in the one working in a slot in the other.

The machine is provided with a bed $n$ to hold the block $o$, in which are fitted the tools or dies $x$ for the hammers to strike on.

The work-releasing levers $q$ have their operative arms located in slots $o'$ in the block $o$, and such levers $q$ are operated by means of levers $p'$, fixed to a rocking shaft $p$, on which is fixed a lever $p^2$, having projections $p^3$, connected by wire ropes $p^4$ to each of the longer arms $d'$ $d^2$ $d^3$.

In the drawings a bolt $y$ is represented in position in one of the tools or dies $x$. A rod $z$ rests on each of the work-releasing levers $q$ and is located in a hole in the block $o$, extending downward from the aperture containing the die or tool $x$ to the slots $o'$. Thus when a blow has been struck by either of the hammers one or other of the longer arms $d'$ $d^2$ $d^3$ will by its wire rope $p^4$ operate the lever $p^2$, which latter by the levers $p'$ acts upon the work-releasing levers $q$ and causes their operative arms to raise the rods $z$, which by striking against the lower part of the work in the tools or dies $x$ releases such work from the latter and thereby prevents it from cooling too fast and from becoming fastened in the dies.

It is advantageous to have several hammers and dies in combination with a single anvil, because the work can be shifted from one to the other more quickly and readily than by the use of a number of separate machines. Moreover, whichever hammer or hammers may be operated all the work-releasing tools are operated by it or them.

By the arrangement of parts as herein described one or more men may work either at the front or side thereof. It will be evident that the machine might in like manner be provided with more than three hammers or with only two hammers, and I would have it understood that the means for limiting the extent of motion of the hammers and for throwing the hammers into and out of action may be variously arranged without departing from the peculiar character of my invention.

What I claim, and desire to secure by Letters Patent, is—

1. In that class of hammers known as "olivers," the combination of a series of hammers connected to overhead spring-poles, a block fitted with tools for the hammers to strike on, means for adjusting the hammer-spindles both laterally and vertically, means for communicating motion to the hammers, means for regulating the strength of blow of the hammers, means for steadying the motion of the hammers, and means for throwing the hammers into and out of action, substantially as hereinbefore set forth.

2. In that class of hammers known as "olivers," the combination of a series of hammers connected to overhead spring-poles, parallel cross-spindles on which the hammer-arms are separately fixed, separate pairs of uprights carrying the hammer-spindles, and means for adjusting the position of the hammer-spindles both vertically and laterally in such uprights, substantially as hereinbefore set forth.

3. In that class of hammers known as "olivers," the combination of a series of hammers connected to overhead spring-poles, hammer-spindles mounted in pairs of uprights, hammer-operating arms on such spindles, hammer-operating treadle-levers, spring connections from such hammer-operating arms to the treadle-levers, treadle-lever-operating arms connected to the treadle-levers, a rocking cross-shaft on which the treadle-lever-operating arms are loosely mounted, clutches mounted on said cross-shaft and capable of slight motion around the same but immovable endwise thereof, corresponding clutch-surfaces on the bosses of the treadle-lever-operating arms, sliding wedges acting to force the treadle-lever-operating arms into connection with their clutches, rods and levers operated by springs to raise the wedges and move the treadle-lever-operating arms out of connection with their clutches, and treadles and connections therefrom to the said wedges to operate the same from either the front or side of the machine, substantially as hereinbefore set forth.

4. In that class of hammers known as "olivers," the combination of a series of hammers connected to overhead spring-poles, means for operating the hammers, means for throwing the hammers into and out of action, and upwardly spring pressed rods bearing constantly against the under side of the hammer-operating arms to steady the motion of the hammers, substantially as hereinbefore set forth.

5. In that class of hammers known as "olivers," the combination of a series of hammers connected to overhead spring-poles, treadle-levers for operating the hammers, means for throwing the hammers into and out of action, toothed racks connected with the treadle-levers, pawls acting in connection with such toothed racks for limiting the upward motion of the treadle-levers and consequently regulating the force of the blow of the hammer, and treadles and connections acting on said pawls either from the front or side of the machine, substantially as hereinbefore set forth.

6. In that class of hammers known as "olivers," the combination of a series of hammers connected to overhead spring-poles, means for operating the hammers, a tool-carrying block for the hammers to strike on, work-releasing levers mounted in said block, and levers connected to the hammer-operating arms and acting on the work-releasing levers, substantially as hereinbefore set forth.

In testimony whereof I affix my signature in presence of two witnesses.

JONATHAN JACKS.

Witnesses:
CLAUDE K. MILLS,
WM. GIRLING.